United States Patent Office 3,256,192
Patented June 14, 1966

3,256,192
REACTION PRODUCTS OF GLYCIDOLS
James M. Petersen, Fishkill, and David D. Reed, Glenham, N.Y., and Herman D. Kluge, deceased, late of Fishkill, N.Y., by Hazel E. Kluge, administratrix, Fishkill, N.Y., assignors to Texaco Inc., New York, N.Y., a corporation of Delaware
No Drawing. Filed Oct. 18, 1962, Ser. No. 232,657
9 Claims. (Cl. 252—46.6)

This invention relates to novel reaction products of glycidol compounds and hydrocarbonthiophosphonic acids. More particularly, the subject invention pertains to polyhydroxyalkyl hydrocarbonthiophosphonates, their method of manufacture, and lubricants containing said thiophosphonates.

The polyhydroxyalkyl hydrocarbonthiophosphonates of this invention are represented by the following formula:

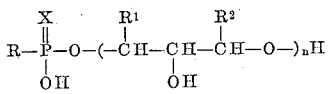

wherein R is a monovalent hydrocarbyl radical, $R^1$ and $R^2$ are hydrogen or an alkyl radical of from 1 to 6 carbon atoms, X is sulfur or a mixture of oxygen and sulfur and $n$ is an average value from 1 to 3.5, inclusively.

Alkaline earth metal salts of hydrocarbonthiophosphonic acids obtained by hydrolysis of phosphorus pentasulfide ($P_2S_5$)-hydrocarbon reaction products are widely used detergent and dispersant additives for lubricants employed in internal combustion engines. The novel glycidol compound-hydrocarbonthiophosphonic acid reaction products of this invention have demonstrated effectiveness as detergent-dispersant additives for lubricating oils and jet fuels.

The thiophosphonates of the invention are prepared by the reaction of a glycidol compound with hydroxyalkyl hydrocarbonthiophosphonic acids.

*Preparation of thiophosphonic acid reactant*

As is well known hydrocarbon-$P_2S_5$ reaction products prepared by the reaction of aromatic hydrocarbons, cycloaliphatic hydrocarbons and aliphatic hydrocarbons with $P_2S_5$ at elevated temperatures. Although a wide variety of hydrocarbons such as aliphatic-substituted aryl compounds and aryl-substituted aliphatic compounds are usable as the hydrocarbon reactant, monoolefins are generally employed as the hydrocarbon reactant. Lubricating oil fractions constitute another preferred class of materials for reaction with $P_2S_5$ to form a product which after further treatment as outlined below is converted to the polyhydroxyalkyl thiophosphonates of the invention.

The olefinic hydrocarbons reacted with $P_2S_5$ usually contain at least 12 carbon atoms although lower molecular weight olefins can be employed. Monoolefin polymers such as isobutylene polymer, butylene polymer, propylene polymer and copolymers of monoolefins such as propylene-isobutylene copolymer are particularly preferred materials for reaction with $P_2S_5$. In general, monoolefin polymers and copolymers having an average molecular weight between about 250 and 50,000 are employed with polymers and copolymers having an average molecular weight in the range from 600 to 5,000 being particularly preferred. Copolymers of conjugated dienes and monoolefins such as copolymer of butadiene and isobutylene having an average molecular weight in the above prescribed range also react with $P_2S_5$. Particular preferred olefin polymers are polybutene polymers having an average molecular weight between 600 and 5,000.

Olefins useful for reaction with the $P_2S_5$ are also prepared by halogenation of high molecular weight hydrocarbon fractions and subsequent dehydrohalogenation. Olefin fractions obtained by cracking of high molecular weight hydrocarbon fractions may also be used as the hydrocarbon reactant.

The reaction product obtained by reacting $P_2S_5$ (about 5–40 wt. percent of reaction mass) with a hydrocarbon at a temperature of from about 100–320° C. in an inert atmosphere, for example, under a blanket of nitrogen, is hydrolyzed at a temperature between about 100 and 260° C. by contact with steam. Steam treatment hydrolyzes the hydrocarbon-$P_2S_5$ reaction product to a hydrocarbonthiophosphonic acid and inorganic phosphorus acids. The hydrocarbonthiophosphonic acid has the general formula:

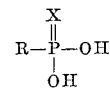

wherein R is derived from the charge hydrocarbon and is usually an olefinic radical containing 20 to 200 carbon atoms, X is sulfur or a mixture of oxygen and sulfur. X in the above formula is designated as sulfur or a mixture of sulfur and oxygen because the steam hydrolysis step usually results in the replacement of a portion of the sulfur joined to the phosphorus with oxygen.

The inorganic phosphorus acids formed during hydrolysis are removed prior to reaction with the glycidol compound. A number of different procedures are available for removal of the inorganic phosphorus acids. In U.S. Patent Nos. 2,951,835 and 2,987,514, removal of the inorganic phosphorus acids is effected by contact with synthetic hydrous alkaline earth metal silicates and synthetic hydrous alkaline metal silicates, respectively. Commonly-assigned copending application, Serial No. 841,668, now U.S. Patent No 3,135,729 filed September 23, 1959 by H. D. Kluge and R. G. Lacoste, describes a process wherein inorganic phosphorus acids are removed from the hydrolyzed product by extraction with anhydrous methanol.

*The glycidol compound reactant*

The glycidol compound which reacts with the hydrocarbonthiophosphonic acid to form the novel polyhydroxyalkyl hydrocarbonthiophosphonates of this invention is represented by the general formula:

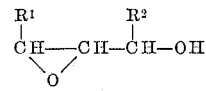

where $R^1$ and $R^2$ are hydrogen or an alkyl of from 1 to 6 carbons. Examples of effective glycidol compounds are the following: glycidol, 2,3-epoxybutanol, 1-methyl-2,3-epoxyhexanol and 1-ethyl-2,3-epoxypropanol.

*Preparation of the novel thiophosphonates*

The reaction can be broadly described by the following equation:

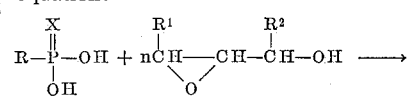

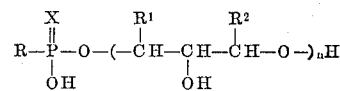

R, $R^1$, $R^2$ and X are as heretofore defined. The reaction product is in essence a mixture of polyhydroxyalkyl hydrocarbonthiophosphonates having one, two, three and etc.

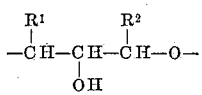

groups. Therefore "$n$" in the above formula is an average value defining the average number of said groups per thiophosphonate molecule.

Reaction of the glycidol compound with hydrocarbonthiophosphonic acid to produce the novel polyhydroxyalkyl hydrocarbonthiophosphonate of this invention is effected at temperatures between about 25 and 175° C. and in a mole ratio of compound to acid of between about 0.7:1 and 5:1, more preferably between about 1:1 and 5:1. Atmospheric and superatmospheric pressures can be employed.

Examples of the thiophosphonates of the invention contemplated herein are 2,3-dihydroxypropyl polybutene (940 M.W.)thiophosphonate, 2,6,7 - trihydroxy - 4-oxaheptyl polybutene(780 M.W.)thiophosphonate, 2,3-dihydroxy - 1 - methylpropyl polypropylene(1500 M.W.) thiophosphate, and 2,6,10,11 tetrahydroxy-3,7,11-triethyl-4,8 - dioxaundecyl polyethylene (1700 M.W.)thiophosphonate.

*Lubricants containing the novel thiophosphonates*

In the lubricating oil compositions containing the thiophosphonates of the invention, hydrocarbon mineral oil may be employed as base materials such as paraffin base, naphthene base or mixed paraffin base distillate or residual oils. Paraffin base distillate lubricating oil fractions are used in the formulation of premium grade motor oil such as are contemplated in this invention. The lubricating mineral oil base generally has been subjected to solvent refining to improve its lubricity and viscosity temperature relationship as well as solvent dewaxing to remove waxy components and improve the pour of the oil. Broadly speaking, a mineral lubricating oil having an SUS viscosity at 100° F. between 50 and 1,000 may be used in the formulation of the improved lubricants of this invention. Usually the viscosity range falls between 70 and 300 at 100° F.

The mineral lubricating oils containing the polyhydroxyalkyl esters of hydrocarbonthiophosphonic acids usually contain other additives designed to impart other desirable properties thereto. For example, V.I. improvers such as polymethacrylates are normally included therein as are corrosion inhibitors and other detergents.

A widely used V.I. improver is a polymethacrylate having the general formula:

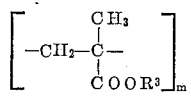

wherein $R^3$ is an aliphatic radical of from 1 to 20 carbons and $m$ is an integer between 600–35,000.

A commonly used supplementary detergent is an alkaline earth metal alkyl phenolate. Barium nonylphenolate, barium dodecylcresolate and calcium dodecylphenolate are examples of such detergents. These products which are well known detergent additives are usually present in the lubricating oil in a concentration between 0.1 and 5 wt. percent.

The most commonly used supplementary inhibitor and antioxidant is a divalent metal dialkyl dithiophosphate resulting from neutralization of a $P_2S_5$-alcohol reaction product with a divalent metal or divalent metal oxide. Barium and zinc dialkyl dithiophosphates are widely used oxidation and corrosion inhibitors. Metal dialkyl dithiophosphates are usually present in the lubricant in a concentration between 0.1 and 3 wt. percent.

Synthetic lubricating bases of the ester or ether type may also be used as the lubricating base oil. High molecular weight high boiling liquid aliphatic dicarboxylic esters possess excellent viscosity-temperature relationships and lubricating properties and are finding ever-increasing utilization in lubricating oils adapted for high and low temperature lubrications. Esters of this type are used in the formulation of jet engine oils.

The polyhydroxyalkyl hydrocarbonthiophosphonates are peresnt in lubricating oils in concentrations sufficient to impart dispersant properties thereto. In concentrations used in the formulation of finished lubricants, the concentration of the thiophosphonate can be as high as 50%. In finished lubricants the concentration of the additive falls between 0.2 and 10 wt. percent with a concentration of between 1 and 5 wt. percent normally employed.

Example I illustrates the preparation of the hydrocarbonthiophosphonic acid from polybutene. Examples II and III demonstrate the preparation of the polyhydroxyalkyl hydrocarbonthiophosphonates from the thiophosphonic acid, prepared by the method described in Example I. Example IV illustrates the lubricant additive properties of the thiophosphonate invention and the thiophosphonate containing lubricant compositions.

EXAMPLE I

A polybutene(940M.W.)thiophosphonic acid was prepared by reacting polybutene having an average molecular weight of about 940 with $P_2S_5$ in a mole ratio of polybutene to $P_2S_5$ of 1:1 and in the presence of sulfur in an amount equal to 1.3 wt. percent of the polybutene. After reaction at 232° C., until the mixture was soluble in n-pentane, the reaction product was diluted with approximately 150 wt. percent of a naphthene base oil having an SUS viscosity at 100° F. of 100, steamed at 176° C. for 10 hours in a nitrogen atmosphere, and then dried by the passage of nitrogen therethrough at 176° C. The hydrolyzed product was extracted with 50% by volume of methyl alcohol at 60° C. to give a methanol extract containing inorganic phosphorus acids in a lubricating oil raffinate containing polybutene(940 M.W.)thiophosphonic acid which after stripping free of methanol had a Neut. No. of 22.6.

The theoretical percent sulfur in a structure of the formula:

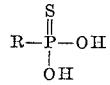

where R is a polybutene radical(940M.W.) is 1.29 wt. percent. The percent sulfur found in the thiophosphonic acid product was 0.51 wt. percent indicating said product is of the formula:

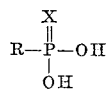

where X is a mixture of oxygen and sulfur and R is as heretofore defined.

EXAMPLE II

Polybutene(940 M.W.)thiophosphonic acid prepared as in Example I in the amount of 1500 grams (0.572 moles based on Neut. No.) was charged to a three liter 3-necked flask equipped with a stirrer, gas inlet tube extending below the surface of the acid reactant and a thermometer immersed in the acid. The acid was heated to 93° C. over a 2 hour period with stirring and nitrogen blowing at approximately 0.5 liter per minute. While the temperature in the flask was maintained at 93° C. and the nitrogen flow rate was reduced to 0.1 liter/minute, 127 grams of glycidol (1.72 moles) was added dropwise to the acid at a temperature of about 97° C. over a 1 hour period and the reaction was permitted to reflux for a 1 hour period. The resultant product was stripped of excess glycidol by heating to 93° C. at 1–2 mm. Hg pressure. The resulting product was shown by analysis to be of the formula:

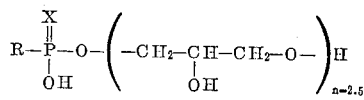

wherein R is a polybutene radical having an average molecular weight of 940 and X is a mixture of sulfur and oxygen. This product analyzed as follows:

| Description | Calculated | Found |
|---|---|---|
| Neut. No | 0 | 0.3 |
| Hydroxyl No | 68.7 | 71 |
| Phosphorus, Wt. percent | 1.09 | 1.04 |
| Mole Ratio Epoxide/Acid in Product | 2.53 | 2.53 |

EXAMPLE III

Polybutene(2210 M.W.)thiophosphonic acid prepared in the manner of Example I in the amount of 1214 grams (0.22 moles based on Neut. No.) was charged to a 3 liter 3-necked flask equipped with a stirrer, a gas inlet tube extending below the surface of the acid reactant and a thermometer immersed in the acid. The acid was heated to 93° C. over a 1 hour period with stirring and nitrogen blowing at approximately 0.25 liter/minute. With the temperature of the flask maintained at 93° C. and the nitrogen flow rate reduced to 5–10 mls./minute, 50 grams (0.67 moles) of glycidol were added dropwise over a 1 hour period. The reaction was continued for an additional period of 1 hour. The reaction mixture was stripped of excess glycidol by heating to 93° C. at 1–2 mm. Hg. The resulting product was shown by analysis to be of the formula:

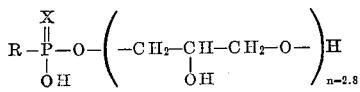

wherein R is a polybutene radical having an average molecular weight of 2210 and X is a mixture of sulfur and oxygen. This product analyzed as follows:

| Description | Calculated | Found |
|---|---|---|
| Neut. No | 0 | 0 |
| Hydroxyl No | 32 | 39 |
| Phosphorus, Wt. percent | 0.53 | 0.49 |
| Sulfur, Wt. percent | [1] 0.56 | 0.30 |
| Mole ratio oxide/acid in product | 2.8 | 2.8 |

[1] X=100% S.

EXAMPLE V

This example illustrates the lubricant compositions of the invention and the outstanding dispersant properties of the thiophosphonates of the invention in lubricant.

In the well known CLR low temperature sludge tests an SAE 10W–30 motor oil containing thiophosphonate of the type produced in Example II was tested. Oils A and B below are examples of lubricants of the invention and Oil C is the control:

| Description | Oil A [1] | Oil B [1] | Oil C |
|---|---|---|---|
| Refined Paraffinic Distillate Oil, Wt. percent (SUS Visc. at 100° F.=100) | 90.7 | 88.50 | 92.72 |
| Thiophosphate Product of Example II | 2.02 | 4.22 | 0 |
| Barium C12 alkylphenolate, Wt. percent | 1.83 | 1.83 | 1.83 |
| Zinc isopropyl 1,3 dimethylbutyl dithiophosphate, Wt. percent | 0.88 | 0.88 | 0.88 |
| Mineral oil concentrate containing 25 wt. percent of a copolymer of a mixed methacrylate alkyl ester in which the alkyl group range from butyl to octadecyl, wt. percent | 4.00 | 4.00 | 4.00 |
| CO2 neutralized sulfurized basic barium sulfonate (0.08 wt. percent Ba) | 0.57 | 0.57 | 0.57 |
| Dimethylsilicone anti-foam concentrate, p.p.m | 150 | 150 | 150 |

[1] Analyzed wt. percent phosphorus in Oil A is 0.022 and in Oil B 0.04.

The CLR sludge engine results for the above formulation are as follows:

CLR SLUDGE TEST DATA [1]

| Test, Time Hours | Oil A | Oil B | Oil C |
|---|---|---|---|
| 38 | | | 6.9 |
| 54 | 9.5 | 9.7 | 5.4 |
| 70 | 9.1 | 9.5 | |
| 84 | 8.0 | | |
| 94 | 7.0 | 9.4 | |
| 110 | 5.2 | 9.1 | |
| 126 | | 8.4 | |
| 129 | | 8 | |
| 146 | | 5.4 | |

[1] Clean oil rating=10.

As can be seen from the above table the thiophosphonates of the invention substantially inhibit the formation of sludge in engine oils (Oils A and B).

We claim:
1. A product selected from the group consisting of polyhydroxyalkyl hydrocarbonthiophosphonate and a mixture of said hydrocarbonthiophosphonate and the corresponding polyhydroxyalkyl hydrocarbonphosphonate, said hydrocarbonthiophosphonate of the formula:

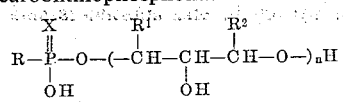

where R is a hydrocarbyl derived from a polyolefin having an average molecular weight between about 250 and 50,000, X is sulfur, $R^1$ and $R^2$ are selected from the group consisting of hydrogen and alkyl from 1 to 6 carbons and $n$ is an average value from 1 to 3.5, inclusively, said mixture consisting of a major amount of said hydrocarbonthiophosphonate and a minor amount of said corresponding hydrocarbonphosphonate where X is oxygen.

2. A product in accordance with claim 1 wherein said product is said mixture, R is a polyolefin radical having an average molecular weight between 250 and 50,000, and $R^1$ and $R^2$ are hydrogen, and $n$ is an average value from 1 to 3.5, inclusively.

3. A product in accordance with claim 1 wherein said product is said mixture, said hydrocarbonthiophosphonate is polybutene(940 M.W.)thiophosphonate of the formula:

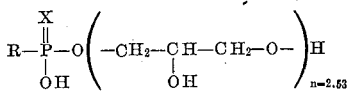

where R is a polybutene radical of an average molecular weight of 940.

4. A product in accordance with claim 1 wherein said product is said mixture and said hydrocarbonthiophosphonate is polybutene(2210 M.W.)thiophosphonate of formula:

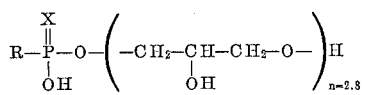

where R is polybutene radical of an average molecular weight of 2210.

5. A lubricating oil composition comprising lubricating oil containing an additive selected from the group consisting of polyhydroxyalkyl hydrocarbonthiophosphonate and a mixture of said polyhydroxyalkyl hydrocarbonthiophosphonate and corresponding polyhydroxyalkyl hydrocarbonphosphonate in an amount sufficient to impart detergent properties thereto, said thiophosphonate having the formula:

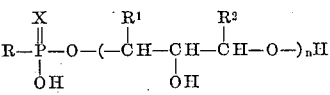

where R is a monovalent hydrocarbyl derived from a polyolefin having an average molecular weight between about 250 and 50,000, $R^1$ and $R^2$ are selected from the group consisting of hydrogen and alkyl of from 1 to 6 carbons, X is sulfur and $n$ is an average value from 1 to 3.5, inclusively, said lubricating oil being a member selected from the group consisting of mineral lubricating oil, synthetic ester lubricating oil and synthetic ether lubricating oil, said mixture consisting of a major amount of said hydrocarbonthiophosphonate and a minor amount of said corresponding hydrocarbonphosphonate where X is oxygen.

6. A lubricating oil composition in accordance with claim 5 wherein said thiophosphonate is present in a concentration between 0.2 and 10 wt. percent.

7. A lubricating oil composition in accordanme with claim 5 wherein said additive is present in a concentration between 0.2 and 10 wt. percent and said lubricating oil is mineral lubricating oil having an SUS viscosity at 100° F. between 50 and 1,000.

8. A lubricating oil composition in accordance with claim 5 wherein said additive is present in a concentration between 0.2 and 10 wt. percent, said lubricating oil is a mineral lubricating oil having an SUS viscosity at 100° F. between 50 and 1,000, R is a polybutene radical having an average molecular weight of about 940, $R^1$ and $R^2$ are hydrogen, said additive is said mixture and $n$ is 2.53.

9. A lubricating oil composition in accordance with claim 5 wherein said lubricating oil is a mineral lubricating oil having an SUS viscosity at 100° F. between 50 and 1,000, said additive is present in a concentration between 0.2 and 10 wt. percent, R is a polybutene radical of an average molecular weight of about 2210, $R^1$ and $R^2$ are hydrogen, said additive is said mixture and $n$ is 2.8.

References Cited by the Examiner

UNITED STATES PATENTS

| | | | |
|---|---|---|---|
| 2,652,426 | 9/1953 | Stayner | 260—461 |
| 2,914,478 | 11/1959 | Neff | 252—46.6 |
| 3,123,630 | 3/1964 | Oberender et al. | 252—46.6 |
| 3,162,668 | 12/1964 | Reed et al. | 260—461 |

FOREIGN PATENTS

| | | |
|---|---|---|
| 792,553 | 3/1958 | Great Britain. |
| 838,928 | 6/1960 | Great Britain. |

DANIEL E. WYMAN, *Primary Examiner.*

L. G. XIARHOS, *Assistant Examiner.*